(12) United States Patent
Sibuet et al.

(10) Patent No.: US 10,653,902 B2
(45) Date of Patent: May 19, 2020

(54) STOWAGE DEVICE OF EMERGENCY EQUIPMENT FOR AIRCRAFT CREWMEMBER

(71) Applicant: Zodiac Aerotechnics, Plaisir (FR)

(72) Inventors: Jean-Philippe Sibuet, Verneuil sur Seine (FR); Olivier Potet, Palaiseau (FR)

(73) Assignee: Zodiac Aerotechnics, Plaisir (FR)

( * ) Notice: Subject to any disclaimer, the term of this patent is extended or adjusted under 35 U.S.C. 154(b) by 294 days.

(21) Appl. No.: 15/540,521

(22) PCT Filed: Jan. 15, 2015

(86) PCT No.: PCT/IB2015/000154
§ 371 (c)(1),
(2) Date: Jun. 28, 2017

(87) PCT Pub. No.: WO2016/113584
PCT Pub. Date: Jul. 21, 2016

(65) Prior Publication Data
US 2018/0001121 A1 Jan. 4, 2018

(51) Int. Cl.
*A62B 25/00* (2006.01)
*B64D 10/00* (2006.01)
(Continued)

(52) U.S. Cl.
CPC ............ *A62B 25/005* (2013.01); *A62B 18/02* (2013.01); *B64D 10/00* (2013.01); *B64D 11/00* (2013.01); *B64D 2231/025* (2013.01)

(58) Field of Classification Search
CPC ....... A62B 25/00; A62B 25/005; A62B 18/00; A62B 18/02; A62B 7/14; B64D 11/00; B64D 2231/00; B64D 2231/025
See application file for complete search history.

(56) References Cited

U.S. PATENT DOCUMENTS 5,333,748 A * 8/1994 Schnoor ................ A62B 25/00
  220/844
8,393,326 B2 * 3/2013 Bachelard ................ A62B 7/14
  128/202.27

(Continued)

FOREIGN PATENT DOCUMENTS

| WO | 1990002582 | 3/1990 |
| WO | 2012085616 | 6/2012 |
| WO | 2013064856 | 5/2013 |

OTHER PUBLICATIONS

Sweep-On Fullface Crew Oxygen Mask System, B/E Aerospace Inc., Oct. 2, 2000 (Year: 2000).*

(Continued)

*Primary Examiner* — Bradley H Philips
*Assistant Examiner* — Savannah L Gabriel
(74) *Attorney, Agent, or Firm* — Kilpatrick Townsend & Stockton LLP; Dean W. Russell

(57) ABSTRACT

A stowage device of emergency equipment for aircraft crewmember, the stowage device comprising a housing, the housing extends along a longitudinal direction and has side walls, a back wall and an opening opposite to the back wall, the side walls and the back wall define an internal space adapted to stow a respiratory mask in a stowage position, the side walls extend along the longitudinal direction up to a front edge delimiting the opening. One of the side walls is an adjustable wall. The housing comprises a frame and a movable element. The movable element is mounted on the frame and is movable between a retracted position and a protruding position. The movable element comprises a main movable panel and the adjustable wall includes the main movable panel.

23 Claims, 6 Drawing Sheets

(51) Int. Cl.
*B64D 11/00* (2006.01)
*A62B 18/02* (2006.01)

(56) References Cited

U.S. PATENT DOCUMENTS

| | | | | |
|---|---|---|---|---|
| 2002/0189617 | A1* | 12/2002 | Cordero | A62B 25/005 128/205.25 |
| 2003/0188989 | A1* | 10/2003 | Taieb | A62B 25/005 206/527 |
| 2004/0144384 | A1* | 7/2004 | Martinez | A62B 25/005 128/204.29 |
| 2012/0186586 | A1* | 7/2012 | Gill | A62B 25/005 128/205.25 |

OTHER PUBLICATIONS

International Patent Application No. PCT/IB2015/000154, International Search Report and Written Opinion, dated Sep. 28, 2015, 8 pages.

* cited by examiner

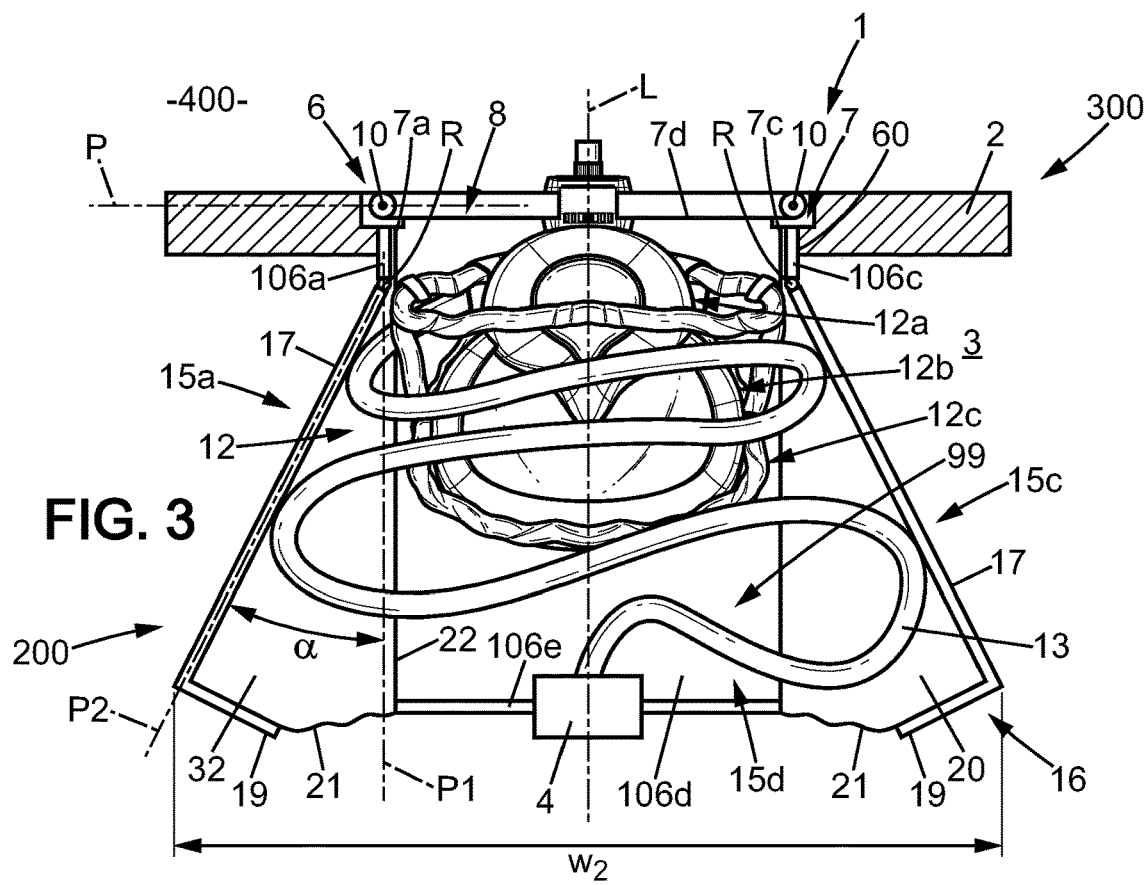

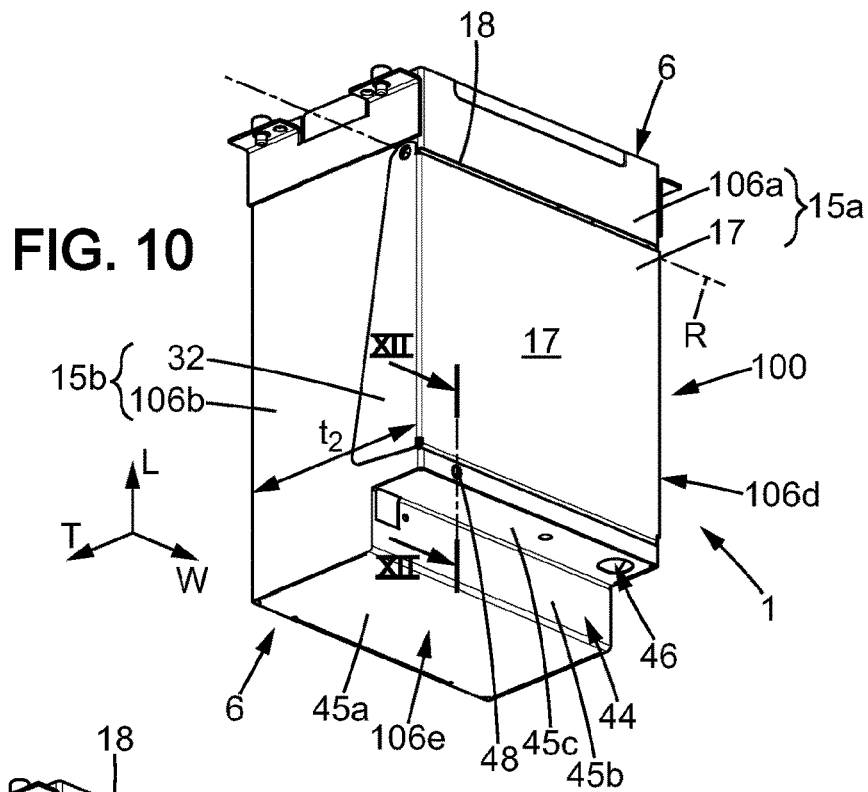
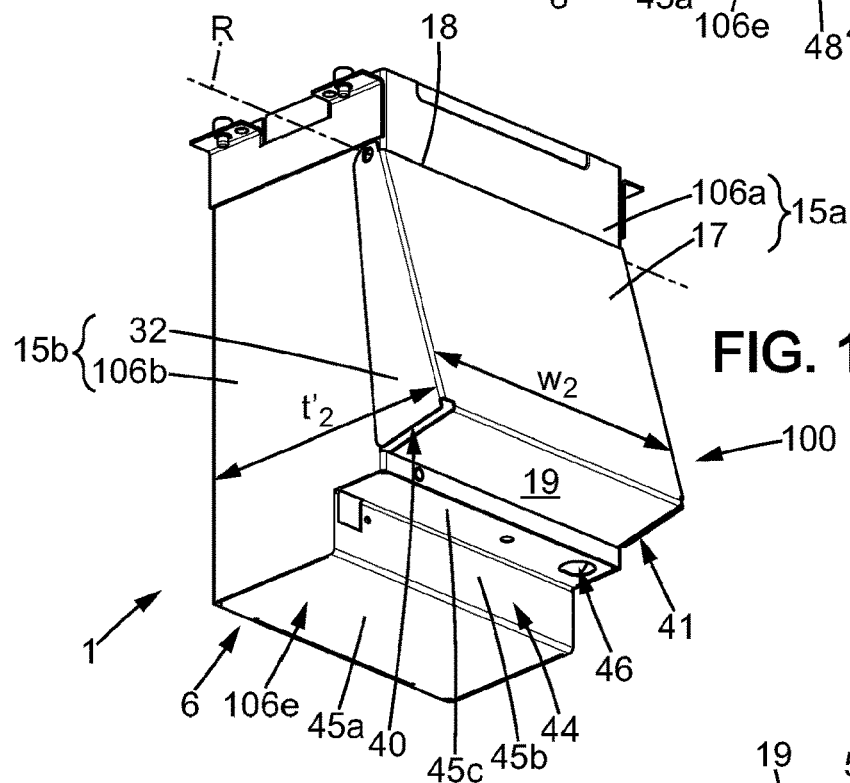
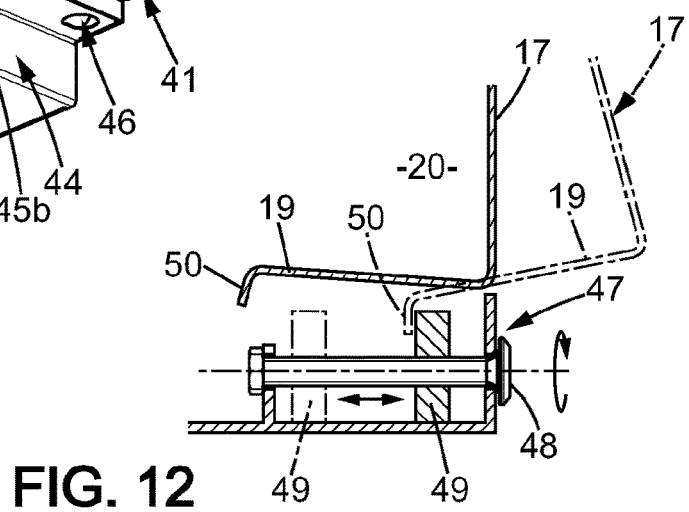

STOWAGE DEVICE OF EMERGENCY EQUIPMENT FOR AIRCRAFT CREWMEMBER

CROSS REFERENCE TO RELATED APPLICATION

This patent application is the U.S. national stage entry of PCT/IB2015/000154, filed on Jan. 15, 2015, the contents of which are hereby incorporated in its entirety by this reference.

FIELD OF THE INVENTION

The present invention relates to a stowage device of emergency equipment for aircraft flight crew. The invention also relates to an emergency equipment comprising a respiratory mask and the stowage device. The invention further relates to an installation comprising the emergency equipment placed in an instrument panel of an aircraft cockpit.

BACKGROUND OF THE INVENTION

The respiratory mask comprises an oronasal face piece and a harness. The oronasal face piece is intended to be applied on the face of the user in a use position to provide oxygen enriched respiratory gas. The harness enables to maintain the oronasal face piece on the face of the user. The respiratory mask may comprise a separate eye protective shield (goggles) or an eye protective shield integral with the oronasal face piece. The eye protective shield provides protection in particular against smoke and can also support a display device.

In a stowage position, the respiratory mask is stowed in the stowage device, in the cabin of a commercial aircraft having crewmembers and passengers. The cabin is pressurised for enabling the passengers and the pilots to normally breathe within the cabin.

In case of depressurisation, due a to a failure of the pressurising device or a hole through which the cabin air leaks, the user of the emergency equipment, usually a pilot, grasp the respiratory mask bring it out of the stowage device through an opening and place the respiratory mask on the face in a use position with only one hand.

Such stowage devices are important for protecting the respiratory mask and they satisfy the need for having a location for storing the respiratory mask in a predefined position so as to ensure that the aircraft crewmember quickly applies the respiratory on his face.

That is the reason why the stowage devices are sometimes placed into the instrument panel of the aircraft cockpit, within arm's reach, near the pilots. The stowage device may be in front or on one side of the pilot.

When an oxygen deficiency is detected, the pilot has got less than 5 seconds to grasp the emergency mask and to apply it on his face.

So, it is important that the respiratory mask can move easily in the stowage device and the harness quickly inflates.

But, the cockpit of the aircrafts has usually a dedicated place for mounting such stowage devices. Because of all the other equipments which have also to be within arm's reach of the pilot, such a dedicated place is limited and the stowage device have to respect some dimensional features. Therefore, the size of the opening cannot be increased.

An object of the invention is to provide a stowage device from which the emergency equipment can be extracted easily, which enables the harness to be quickly and completely inflated and which takes into account the technical requirement relating to the place dedicated to receive the stowage device.

Another object of the invention is to provide such a stowage device, which can be quickly replaced by another one in case of deficiency, or that can replace a former stowage device in case of refitting of the cockpit or failure of the former stowage device.

SUMMARY OF THE INVENTION

To this end, according to the invention, the stowage device comprises a housing. The housing extends along a longitudinal direction and has side walls, a back wall and an opening opposite to the back wall, the side walls and the back wall define (circumscribe) an internal space adapted to stow a respiratory mask in a stowage position, the side walls extend along a longitudinal direction up to front edges delimiting the opening. One of the side walls is an adjustable wall. The housing comprises a frame and a movable element. The movable element is mounted on the frame and is movable between a retracted position and a protruding position.

The movable element comprises a main movable panel. And, the adjustable wall includes said main movable panel.

Thanks to these features, the internal space of the stowage device in the protruding position is increased with respect to the internal space of previous stowage devices having the same opening. Consequently, the risk of having the harness jammed in the oronasal face piece or in the eye protective shield during the stowage is reduced. Thus, the emergency equipment can be more easily moved in the stowage device, can be more easily brought out of the stowage device and the risk of unsatisfying inflation of the harness is reduced, without increasing the passage in the instrument panel through which the stowage device has to be inserted. Indeed, usually the section of passage through which the stowage device has to be inserted is narrower than the section of the dedicated space away from said passage.

Furthermore, because the side wall can be moved in the retracted position, the stowage device can be pulled, withdrawn through said passage and replaced by another stowage device if needed.

The invention could also comprise one or several of the following features:

- the movable element is rotatably mounted on the frame around a rotation axis;
- the rotation axis is distant from the opening along the longitudinal direction;
- the side walls extend along the longitudinal direction between back edges and the front edges, the front edges of the side walls define the opening, the rotation axis is substantially parallel to the front edge of the adjustable wall, and the rotation axis is distant between 3 centimetres and 10 centimetres from the opening;
- the rotation axis is substantially perpendicular to the longitudinal axis,
- the frame comprises a fixed panel, and the adjustable wall comprises the main movable panel and the fixed panel;
- the frame comprises a fixed panel, the adjustable wall comprises the main movable panel and the fixed panel, in the retracted position the main movable panel is parallel to the fixed panel and flush with the fixed panel, and in the protruding position the main movable panel is angled (inclined) with respect to the fixed panel;

in the protruding position, the main movable panel is angled between 5 degrees and 20 degrees, preferably between 7 degrees and 15 degrees with respect to the fixed panel;

the housing further has a fixing flange outside the internal space and proximate the opening and, in the retracted position, the side walls have overall dimensions perpendicularly to the longitudinal direction which are substantially constant along the longitudinal direction, the movable element is urged in the retracted position;

the stowage device further comprises a spring urging the movable element;

the stowage device comprises a retaining element, which limits the move of the movable element to the protruding position;

the retaining element is flexible and comprises a first end fixed to the movable element and a second end fixed to the frame;

the retaining element comprises an abutting element against which the movable element abuts in the protruding position, the retaining element is adjustable to modify the protruding position, the stowage device comprises a closing part, which closes a gap between the main movable panel and the frame in order to avoid any jamming of the respiratory mask in the protruding position of the movable element;

the closing part is a flexible element and the flexible element extends between an edge of the movable element and an edge of the frame;

the closing part is a rigid piece and is integral with the movable element, the movable element comprising:
 a back movable panel extending substantially perpendicularly to the main movable panel;
 a first lateral movable panel and a second lateral movable panel extending substantially perpendicularly to the main movable panel and to the back movable panel;

the movable element comprises a first slot between the back movable panel and the first lateral movable panel and a second slot between the back movable panel and the second lateral movable panel, a first lateral frame panel of the frame slides in said first slot and a second lateral frame panel of the frame slides in said second slot when the movable element moves between the retracted position and the protruding position.

The invention also deals with an emergency equipment for aircraft crewmember comprising:
 the stowage device as specified above,
 a respiratory mask comprising an oronasal face piece and an inflatable harness connected to the oronasal face piece, the oronasal face piece being adapted to be applied in a use position on a face of a user and the inflatable harness being connected to the oronasal face piece and adapted to maintain the respiratory mask on a user face, in a stowage position of the emergency equipment the respiratory mask is in the internal space and the movable element is in the protruding position, and
 an oxygen supply tube connected to the respiratory mask for supplying the respiratory mask with oxygen.

According to a supplementary feature in accordance with the invention, preferably the opening is covered by two doors mounted on the frame, a hole is provided between said two doors and a portion of the respiratory mask goes through said hole in the stowage position, in order to enable the respiratory mask to be quickly brought out of the housing.

According to another feature in accordance with the invention, preferably the oxygen supply tube is connected to a fluid connector supported by the back wall, for connecting the oxygen supply tube to an oxygen supply device.

The invention also deals with an installation comprising the emergency equipment as specified above, and an instrument panel having a compartment in which the housing is placed, said instrument panel being provided inside a cockpit of an aircraft.

BRIEF DESCRIPTION OF THE DRAWINGS

The invention will be better understood with the help of the drawings, in which:

FIG. 3 is a longitudinal sectional view of the installation comprising the stowage device according to the first embodiment, shown in a protruding position, FIG. 4 is a longitudinal sectional view showing a second embodiment of the stowage device according to the invention, in the retracted position.

FIG. 10 is a perspective view illustrating a stowage device in accordance with a fifth embodiment of the invention, in the retracted position;

FIG. 11 is a perspective view of the stowage device shown in FIG. 10, in the protruding position, and FIG. 12 is a cross section at enlarged scale according to the line referenced XII in FIG. 10.

DETAILED DESCRIPTION OF EMBODIMENTS OF THE INVENTION

Figure 2:
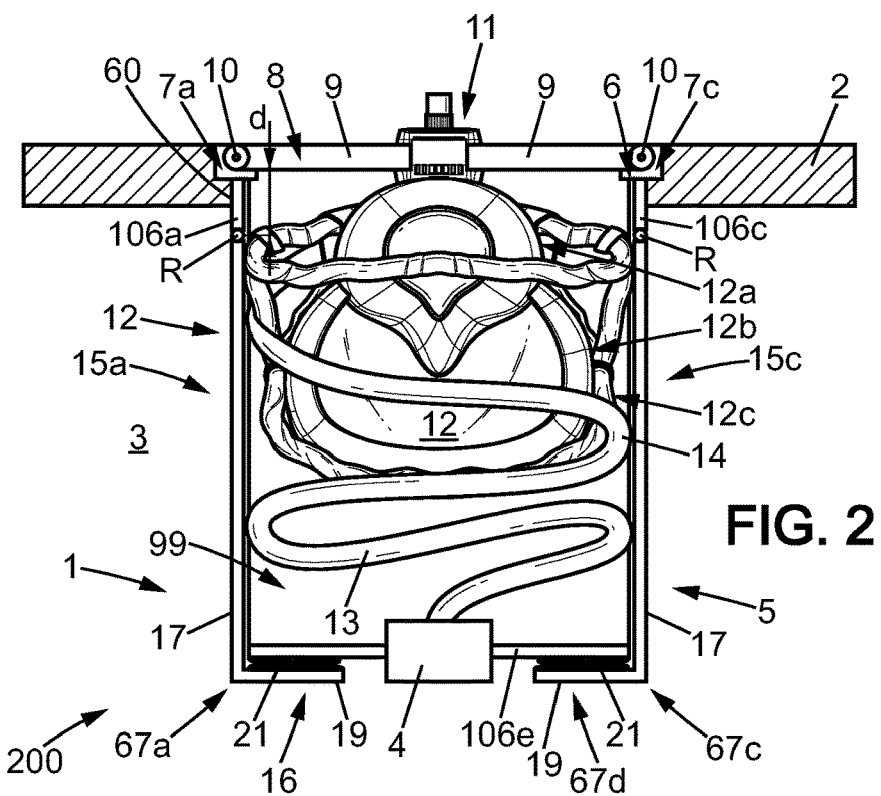
FIG. 2 is a longitudinal sectional view of an installation comprising the stowage device according to the first embodiment, shown in the retracted position.

The FIGS. 2 and 3 show an installation 300 comprising an emergency equipment 200 and an instrument panel 2 arranged in a cockpit 400 of an aircraft. The emergency equipment 200 comprises a stowage device 1, a respiratory mask 12 and an oxygen supply tube 13.

The respiratory mask 12 comprises an oronasal face piece 12a, an eye protective shield 12b, a harness 12c and a grasping portion 11. The oronasal face piece is adapted to be applied in a use position on a face of a user. The inflatable harness (12c) is connected to the oronasal face piece 12a and adapted to maintain the oronasal face piece 12a on the face of a user in a use position (not shown).

The stowage device 1 comprises a housing 5 extending in a longitudinal direction L. The housing 5 essentially comprises a frame 6, a first movable element 100 and a second movable element 100, in the embodiment shown in FIGS. 2 and 3. The second movable element is identical to the first movable element 100. The housing has a pair of lateral side walls 15b, 15d, a pair of transversal side walls 15a, 15c, a back wall 16 and an opening 8 opposite to the back wall 8. The side walls 15a, 15b, 15c, 15d and the back wall define an internal space 99. The side walls 15a, 15b, 15c, 15d extend along the longitudinal direction L between respective back edges 67a, 67b, 67c, 67d close to the back wall 16 and respective front edges 7a, 7b, 7c, 7d. The front edges 7a, 7b, 7c, 7d of the side walls 15a, 15b, 15c, 15d define the opening 8.

The lateral side walls 15b, 15d are parallel and, viewed in a cross section perpendicularly to the longitudinal direction L, the lateral side walls extend along a width direction W. The transversal side walls 15a, 15c are parallel and, viewed in a cross section perpendicularly to the longitudinal direction L, the transversal side walls 15b, 15d extend along a transversal direction T. The transversal direction T is perpendicular to the width direction W. The longitudinal direction L is perpendicular to the width direction W and to the transversal direction T.

The instrument panel 2 is substantially a flat panel having passages through which are inserted several display devices D1, D2, D3 (schematically represented in FIGS. 4 and 5) for controlling the aircraft.

The stowage device 1 is inserted from the cockpit 400 into a passage 60 in the instrument panel 2. The passage 60 is usually in front of the pilot and in such a case the longitudinal direction L is preferably substantially horizontal, or at a side of the user and in such a case the longitudinal direction L is preferably substantially vertical.

The shape and the section (perpendicularly to the longitudinal direction L) of the passage 60 made through the instrumental panel 2 in which the stowage device is inserted is normalized. The section is rectangular and there are two passage sizes: either 14.6 cm (5.75 inches) along the width direction W and 11.43 cm (4.5 inches) along the transversal direction T or 20 cm (7.87 inches along the width direction W and 12.19 cm (4.8 inches) along the transversal direction T.

The stowage device 1 extends behind the instrument panel 2 in a chamber or compartment 3. The dedicated place behind the instrumental panel 2 can have different shape or can present different dimensions depending in particular on the company which builds the aircraft and the surrounding devices D1, D2, D3.

The frame 6 comprises a pair of lateral frame panels 106b, 106d and a pair of transversal frame panels 106a, 106c. The lateral frame panels 106b, 106d and the transversal frame 106a, 106c extend along the longitudinal direction L. The lateral frame panels 106b, 106d further extend in the width direction W. In other words, the lateral frame panels 106b, 106d are substantially flat and extend perpendicularly to the transversal direction T. The transversal frame panels 106a, 106c further extend in the transversal direction T. In other words, the transversal frame panels 106a, 106c are substantially flat and extend perpendicularly to the width direction W.

The frame 6 further comprises a back frame panel 106e which is part of the back wall 16. Along the longitudinal direction L, the lateral frame panel 106b and the lateral frame panel 106d extends from the respective back edges 67b, 67d to the respective front edges 7b, 7d. The lateral frame panel 106b is rigidly fixed to the back frame panel 106e proximate the back edge 67b and the lateral frame panel 106d is rigidly fixed to the back frame panel 106e proximate the back edge 67d. Proximate the opening 8, each of the lateral frame panel 106b and the lateral frame panel 106d is rigidly fixed to the transversal frame panel 106a and to the transversal frame panel 106c along respective edges 22 extending along the longitudinal direction L.

In the embodiment shown in FIGS. 2 and 3, the transversal frame panel 106a and 106c does not extend up to the respective back edges 67a and 67c, but close to an edge 18 of the movable element 200, said edge 18 being away from the respective edges 67a and 67c along the longitudinal direction L.

The frame 6 is rigid. Some of the lateral frame panels 106b, 106d, transversal frame panels 106a, 106c and back frame panel 106e may be integral with others or to the contrary they can be constituted of several elements rigidly fixed.

The frame 6 further comprises two fixing flanges 62 extending perpendicularly to longitudinal direction L, outside the internal space 99 and proximate the front edges 7a, 7b, 7c, 7d, in other words proximate the opening 8. The fixing flanges 62 are fixed respectively to the transversal frame panel 106a and 106c. The fixing flanges 62 are secured to the instrument panel 2 by screw or the like for fixing the frame 6 to the instrument panel 2 after insertion of the stowage device 1 through the passage 60 up to abutment of the flanges 62 against the instrument panel 2 as shown in FIGS. 2 and 3.

The movable elements 100 are mounted on the frame 6. In the embodiment disclosed in FIGS. 2 and 3, the first movable element 100 is mounted on the transversal frame panel 106a and the second movable element 100 is mounted on the transversal frame panel 106c. The movable elements 100 rotate around a rotation axis between a retracted position shown in FIGS. 1 and 2, and a protruding position shown in FIG. 3. The rotation axis R is perpendicular to the longitudinal direction L, parallel to the edges 7a, 7c and distant from the respective edges 7a, 7c by a distance d. In other words, the rotation axis R is substantially distant from the opening 8 by a distance d. The distance d is preferably within the range 3 centimetres to 10 centimetres.

The movable elements 100 are rigid and comprise a main movable panel 17. In the embodiment shown in FIGS. 2 and 3, the movable elements 100 further comprise a first lateral movable panel 20, a second lateral movable panel 32 and a back movable panel 19. The main movable panel 17, the first lateral movable panel 20, the second lateral movable panel 32 and the back movable panel 19 are substantially flat. The first lateral movable panel 20 and the second lateral movable panel 32 extend perpendicularly to the main movable panel 17. The back movable panel 19 is substantially perpendicular to the main panel 17 and to the first and second lateral movable panels 20, 32. So, in cross section perpendicular to the transversal direction T, the movable elements 100 have a L shape and in a cross section perpendicular to the longitudinal direction L, the movable elements 100 have a U shape. It can also been noticed that the dimension of the movable elements 100 along the longitudinal direction L is much greater that the dimension of the movable elements in the width direction W.

The transversal frame panel 106a which is fixed with respect to instrument panel 2 and the main movable panel 17 of the first movable element 100 define the side wall 15a which is movable. The lateral frame panel 106b which is fixed with respect to instrument panel 2, the first lateral movable panel 20 of the first movable element 100 and the second lateral movable panel 32 of the second movable element 100 define the side wall 15b.

The transversal frame panel 106c which is fixed with respect to instrument panel 2 and the main movable panel 17 of the second movable element 100 define the side wall 15*c* which is movable. The lateral frame panel 106*d* which is fixed with respect to the instrument panel 2, the second lateral movable panel 32 of the first movable element 100 and the first lateral panel 20 of the second movable element 100 define the side wall 15*d*.

The back frame panel 106*e*, the back movable panel 19 of the first movable panel 100 and the back movable panel 19 of the second moveable panel 100 are part of the back wall 16.

The stowage device 1 further comprises a flexible element 21. The flexible element 21 extends between the back movable panel 19 and the back frame panel wall 106*e* to which the flexible is fixed for example by gluing.

As shown in FIG. 2, in the retracted position, the main movable panel 17 of the first movable panel 100 is parallel to, adjacent to and flush with the transversal frame panel 106*a* of the frame 6. Accordingly, in the retracted position, the main movable panel 17 of the second movable panel 100 is parallel to, adjacent to and flush with the transversal frame panel 106*c*. Otherwise, in the retracted position, the main movable panels 17 of the movable panels 100 are positioned according a respective first plan P1 which is approximately perpendicular to a plan P in which the instrument panel 2 extends. Moreover, in the retracted position, the back movable panel 19 of the movable elements 100 is placed behind the back frame panel 106*e*, and the two lateral movable panels 20, 32 of the movable elements 100 are placed over the lateral frame panels 106*b*, 106*c* of the frame 6. The flexible element 21 is folded between the back frame panel 106*e* and the back movable panel 19.

Figure 1:
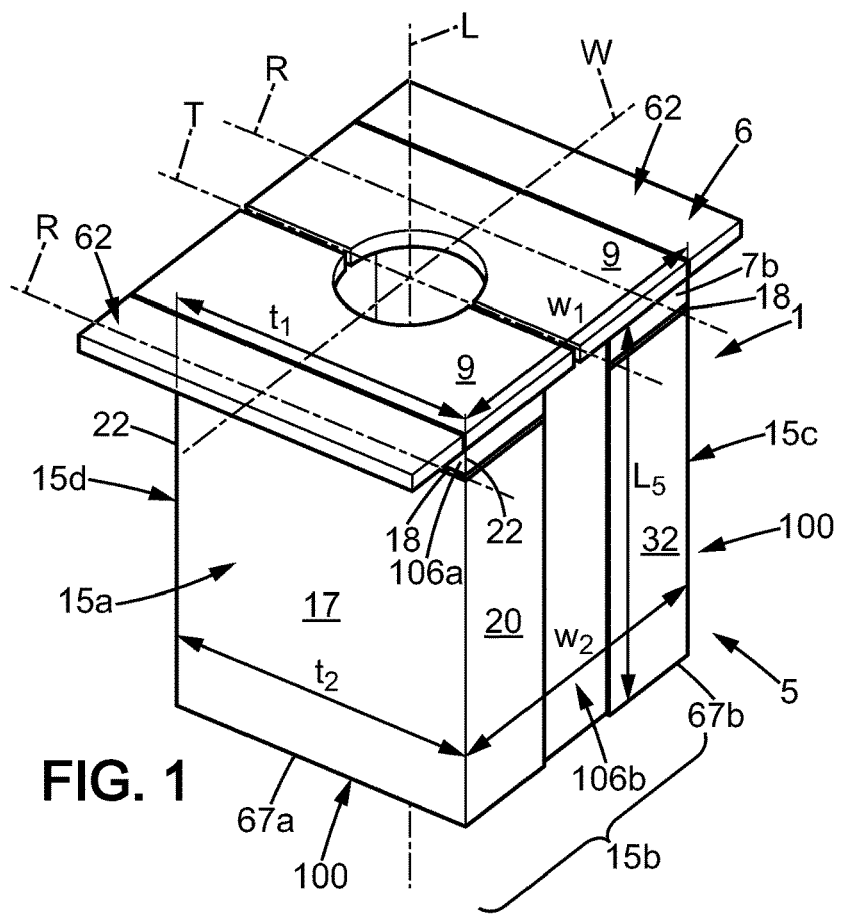
FIG. 1 is a perspective view illustrating a stowage device in accordance with a first embodiment of the invention, in a retracted position.

More generally, in the retracted position, the side walls 15*a*, 15*b*, 15*c*, 15*d* have overall dimensions perpendicularly to the longitudinal direction L which are substantially constant along the longitudinal direction L. As shown in FIG. 1, in the retracted position, along the width direction W the side wall 15*b* and the side wall 15*d* have a width $w_1$ proximate the opening 8 (or in other word at the edges 7*b*, 7*d*) and a width $w_2$ proximate the back end 16 (or in other word at the edges 67*b*, 67*d*). The width $w_1$ is substantially equal to the width $w_2$ and slightly lower than the dimension of the passage along the width direction W. Moreover, along the transversal direction T, the side wall 15*a* and the side wall 15*c* have a dimension $t_1$ proximate the opening 8 (or in other word at the edges 7*a*, 7*c*) and a dimension $t_2$ proximate the back end 16 (or in other word at the edges 67*a*, 67*c*). The dimension $t_1$ is equal to the dimension $t_2$ and slightly lower than the dimension of the passage along the transversal direction T. So, in the retracted position, the housing 5 has a rectangular cross section which is substantially regular along the longitudinal direction L.

It should be noticed that the rotation axis R extends along the transversal direction T and the housing 5 has a dimension $t_1$, $t_2$ along the transversal direction T which is smaller than the width $w_1$, $w_2$ of the housing 5, even in the retracted position of the movable element 100.

The length $L_5$ of the housing 5 is preferably between 15 cm and 35 cm along the longitudinal direction L.

As shown in FIG. 3, in the protruding position, each of the main movable panels 17 the first movable element 100 and the second movable element 100 extends in a respective second plan P2 and are angled by an angle α which is preferably within the range 5 degrees to 20 degrees, preferably 7 degrees to 15 degrees with respect to the respective transversal frame panels 106*a*, 106*c* extending in the first plan P1. In other words in the protruding position, the main movable panels 17 are positioned according to a plan P2 which is inclined with regard to the plan P1.

Moreover, in the protruding position, along the width direction W the side wall 15*b* and the side wall 15*d* have a width $w'_2$ proximate the back end 16 (or in other word at the edges 67*b*, 67*d*) which is substantially greater than the width $w_2$. In the embodiment shown in FIGS. 2 and 3 the width $w'_2$ is about twice as great as the width $w_2$.

In a stowage position of the emergency equipment 200 shown in FIG. 3, the respiratory mask 12 is in the internal space 99 and the movable element 100 is in the protruding position. It can be noticed that, when the movable elements 100 are in the protruding position, the internal space 99 of the housing is higher than when the movable elements are in the retracted position which reduces the risk of having the supply tube 13 or the harness 12*c* of the respiratory mask jammed in the oronasal face piece 12*a* or in the eye protective shield, helping the user to bring out the respiratory mask 12 from the stowage device 1.

The movable elements are easily moved in the protruding position by the respiratory mask 12 when it is stowed in the internal space 99.

In the protruding position, the bendable elements 21 are unfolded, stretched between the back movable panels 19 and the back frame panel 106*e*. The bendable elements 21 retain the movable element 100 to limit the movement of the movable element away from the back frame panel 106*e* to the protruding position.

Furthermore, the bendable elements 21 close the gap between the back movable panels 19 and the back frame panel 106*e* when the movable elements 100 are in the protruding position, preventing any insertion of any element of the respiratory mask 12 into such a gap (which situation could lead to jamming problems when a user try to grasp the mask).

Thus, the bendable elements 21 act as retaining elements and as closing elements.

The stowage device 1 further comprises a fluid connector 4 fixed to the back frame panel 106 and the emergency equipment 200 further comprises an oxygen supply tube 13 connected at one end to the respiratory mask 12 and at the other end to the fluid connector 4 for supplying the respiratory mask with oxygen.

The installation 300 also comprises internal connections (not shown), for connecting a source of pressurized respiratory gas (in particular oxygen) to the fluid connector 4.

The stowage device further comprises two doors 9 covering the opening 8 in the stowage position. Each door 9 is supported by a hinge 10. At the opposite side of the hinge 10, each door 9 comprises a substantially semi cylindrical shape hole, through which the grasping portion 11 of the respiratory mask 12 (FIG. 2) stands out.

In this way, a user (for example a crew member or a pilot) can bring the respiratory mask 12 out of the housing 5, just grasping the grasping part 11 of the emergency mask which stands out, and pulling outwardly, which action opens the doors 9.

In order to automatically move the movable elements 100 in the retracted position when the respiratory mask 12 is outside the internal space 99, the movable elements 100 are preferably urged in the retracted position.

In an alternative embodiment, the stowage device 1 may comprise only one movable element 100. In such a case, the respective transversal frame panel 106*a*, 106*c* would extend along the longitudinal direction L between the front edge 7*a*, 7*c* to the back edge 7*a*, 7*c* where it would be fixed to the back frame panel 106*e* along the back edge 7*a*, 7*c*.

In another alternative embodiment, the movable elements 100 can be different, by their size or their shape.

In another alternative embodiment, the stowage device 1 could be made with three or four movable parts.

Figure 5:
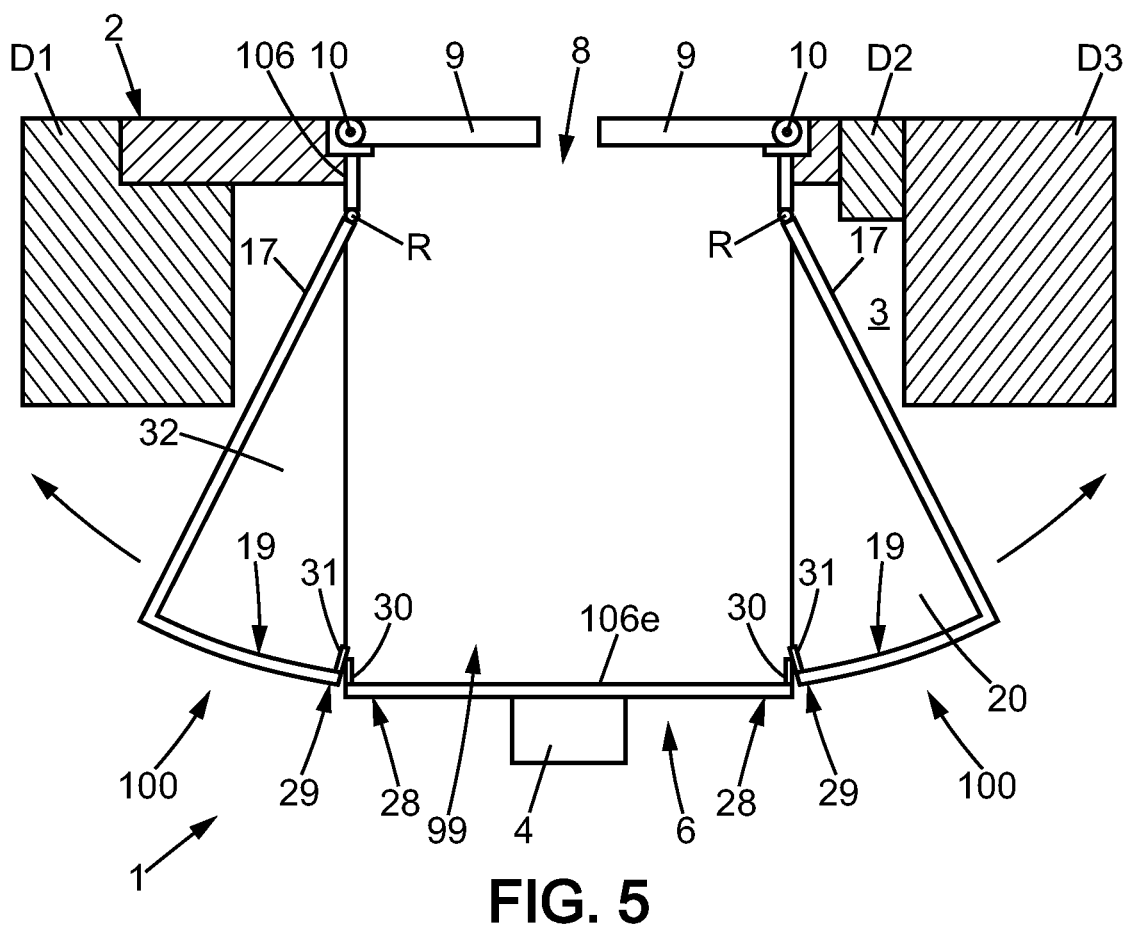
FIG. 5 is a longitudinal cross section showing the stowage device according to the second embodiment, in the protruding position.

FIGS. 4 and 5 show a second embodiment of the stowage device 1 according to the invention. The second embodiment shown in FIGS. 4 and 5 mainly differs from the first embodiment shown in FIGS. 2 and 3 in that, in the protruding position, the back movable panels 19 are substantially adjacent to the back frame panel 106e. Therefore, for each movable element 100, the first lateral movable panel 20, the second lateral movable panel 32 and the back movable panel 19 closes the space between the main movable panel 17 and the frame 6. Therefore, the internal space 99 is entirely closed, except the opening 8, in particular the internal space 99 is closed near the back wall 16.

Moreover, in the protruding position a first protrusion 30 at an end 28 of the back frame panel 106e abuts against a second protrusion 31 at an end 29 of the back movable panel 19.

Figure 6:
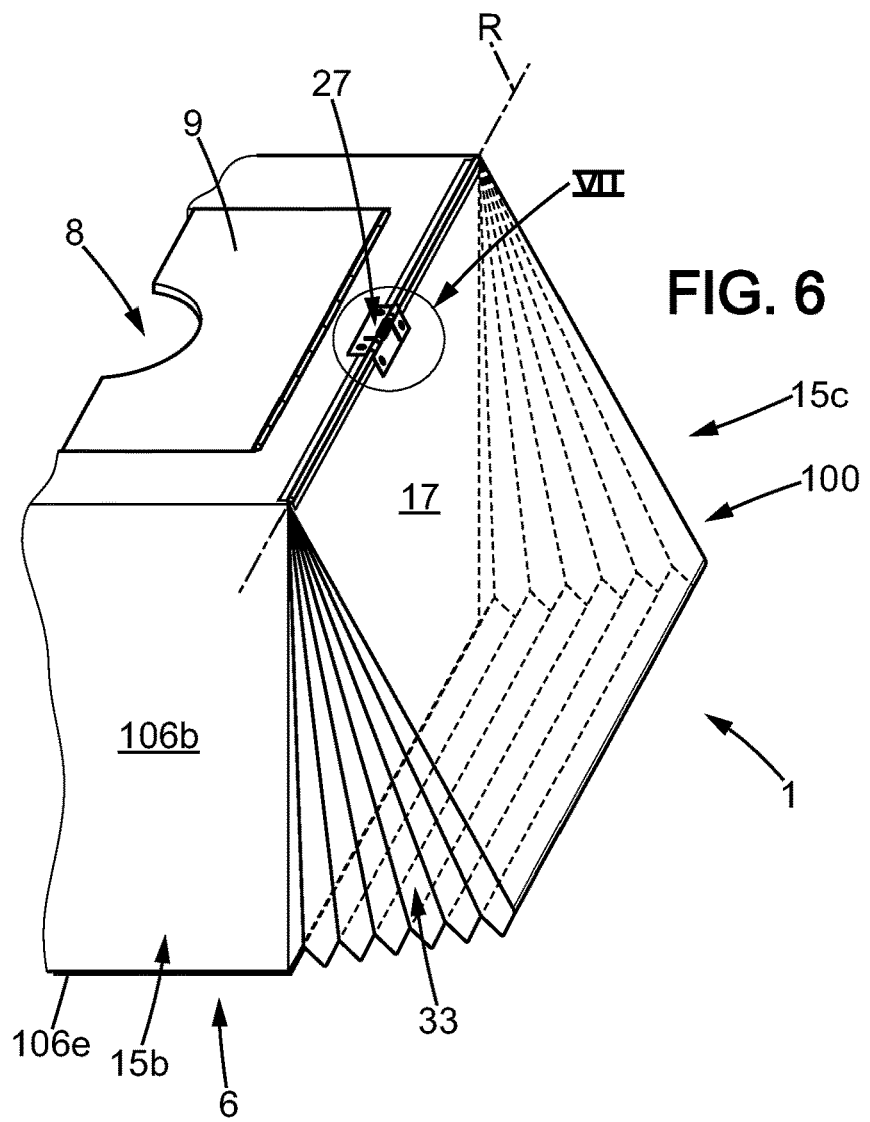
FIG. 6 is a fragmentary perspective view of a third embodiment of the stowage device according to the invention, in the protruding position.
Figure 7:
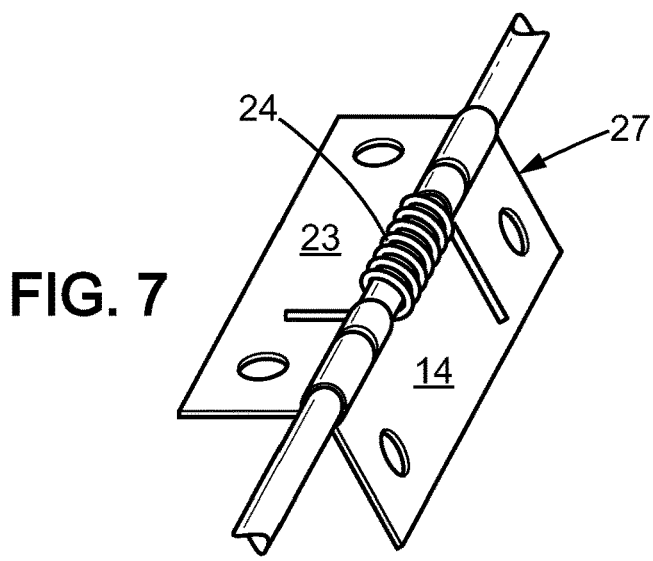
FIG. 7 is a view at enlarged scale of a portion of the stowage device referenced VIII shown in FIG. 6.

FIGS. 6 and 7 show a third embodiment of the stowing device 1 according to the invention. The third embodiment shown in FIGS. 6 and 7 mainly differs from the first embodiment shown in FIGS. 2 and 3 in that the movable elements 100 only comprise the main movable part 17 and a flexible element 33 extends between the main movable part 17, the lateral frame panels 106b, 106d and the back frame panel 106e. Thus, the flexible closing element 33 closes the internal space 99 between the movable element 100 and the frame 6. The flexible closing element 33 has an accordion shape.

The flexible closing element 33 also limits the movement of the movable element 100 away from the back frame panel 106e to the protruding position.

FIGS. 6 and 7 show a hinge 27 connecting the movable element 100 of to the frame 6. The hinge 27 comprises a first plate 23 fixed to the frame and a second plate 14 fixed the movable element 100. A spring 24 urges the two plates to move the movable element 100 toward the retracted position.

Figure 8:
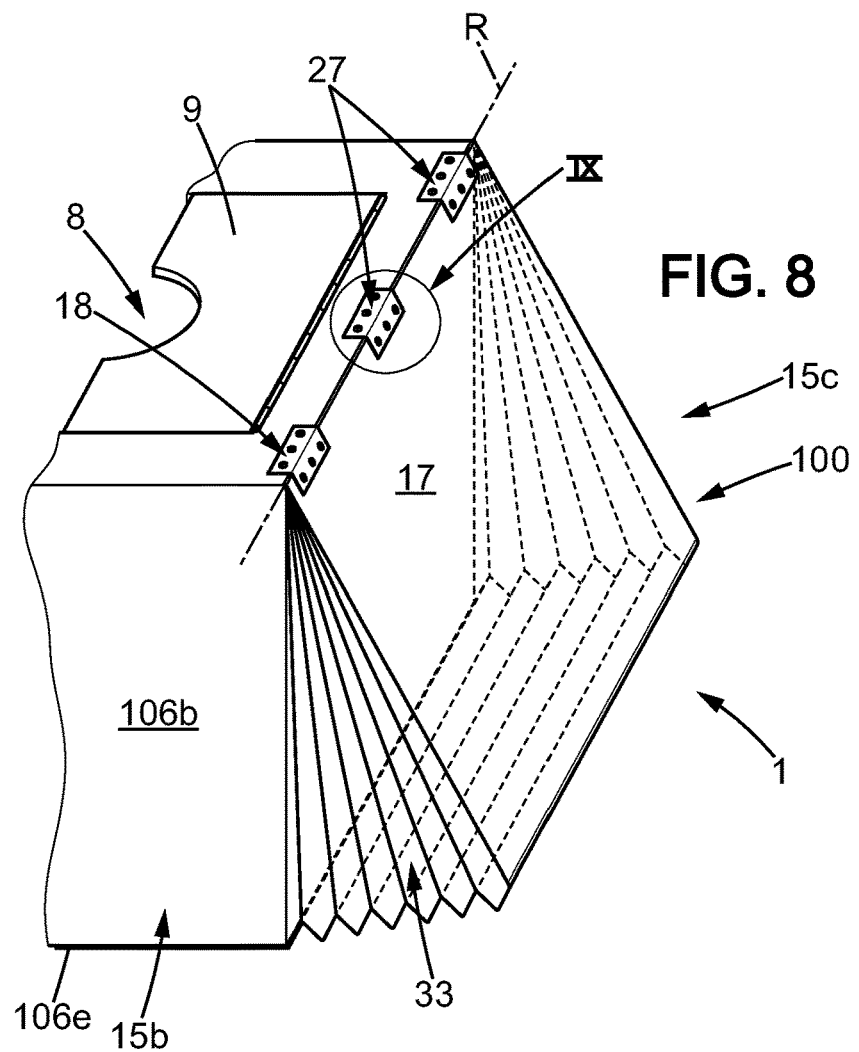
FIG. 8 is a fragmentary perspective view of a fourth embodiment of the stowage device according to the invention, in the protruding position.
Figure 9:
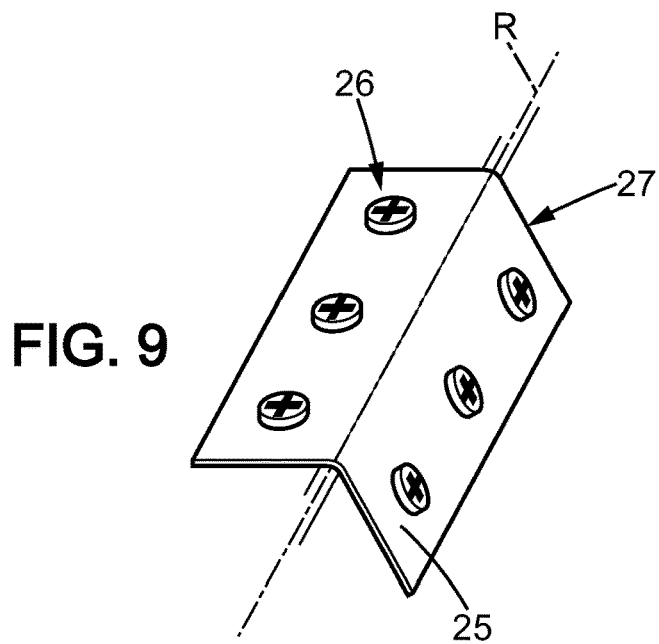
FIG. 9 is a view at enlarged scale of portion of the stowage device referenced IX shown in FIG. 8.

FIGS. 8 and 9 show a fourth embodiment of the stowing device 1 according to the invention. The fourth embodiment shown in FIGS. 8 and 9 mainly differs from the third embodiment in that the hinge is a plastic hinge 27 which comprises only one flexible plate, folded according to a median axis which corresponds to the rotational axis R, separating the flexible plate into two parts 25, 26 which are inclined relative to each other.

FIGS. 10 and 11 show a fifth embodiment of the stowing device 1 according to the invention. The fifth embodiment shown in FIGS. 10 and 11 differs from the first embodiment shown in FIGS. 2 and 3 in that the rotation axis R extends in the transversal direction T, the stowage device 1 comprises only one movable element 100 and the movable element 100 has a first slot 40 between the back movable panel 19 and the first lateral movable panel 20 and a second slot 41 between the back movable panel 19 and the second lateral movable panel 32. These three features are independent.

As the rotation axis extends in the width direction W, the housing 5 has a dimension $t_2$ along the transversal direction T which is smaller than the width $w_2$ of the housing 5 in the retracted position of the movable element 100. But, the dimension $t'_2$ along the transversal direction T is increased in the protruding position and becomes closer to the width $w_2$.

Otherwise, the lateral frame panel 106b slides in the first slot 40 and the lateral frame panel 106d slides in the second slot 41 when the movable element 100 moves between the retracted position and the protruding position. So, the first lateral movable panel 20 is over the lateral frame panel 106d (outside the internal space 99) and the second lateral movable panel 32 is over the lateral frame panel 106b (outside the internal space 99), but the back movable panel 19 extends in the internal space 99 in the retracted position.

Moreover, the fifth embodiment shown in FIGS. 10 to 12 comprises a mechanism 47 to adjust the movement of the movable element 100.

The back movable panel 19 of the movable element 100 comprises a curved portion forming an abutment portion 50. In the protruding position, the abutment portion 50 of the movable element 100 abuts against an abutment element 49. The abutment element 49 is a nut engaging a screw 48. The abutment element 49 is free to slide along the transversal direction T, but cannot rotate around the transversal direction T. So, when the screw 48 is rotated around the transversal direction T, the abutment element 49 slides along the transversal direction T.

Otherwise, the back frame panel 106e comprises a step 44 defined by two portions 45a, 45c extending perpendicularly to the longitudinal direction L and a portion 45b extending perpendicularly to the transversal direction T and joining the portions 45a and 45c.

The step 44 is made in order to correspond to a shape of the compartment 3, dedicated to receive the stowage device 1.

The back frame panel 106e further comprises a hole 46, through which the supplying tube 13 of the respiratory mask 12 can go through, to be connected to an oxygen source.

The invention claimed is:

1. A stowage device of emergency equipment for aircraft crewmember, the stowage device comprising a housing, the housing extends along a longitudinal direction and has side walls, a back wall and an opening opposite to the back wall, the side walls and the back wall define an internal space adapted to stow a respiratory mask in a stowage position, the side walls extend along said longitudinal direction up to front edges delimiting the opening, and the back wall comprises a fluid connector, wherein:
one of the side walls is an adjustable wall,
the housing comprises a frame and a movable element,
the movable element is mounted on the frame and is movable between a retracted position and a protruding position, the movable element being rotatably mounted on the frame about a rotation axis that is distant from the opening along the longitudinal direction,
the movable element comprises a main movable panel having a free end (a) in contact with the back wall when the movable element is in the retracted position and (b) distant from the back wall when the movable element is in the protruding position, and
the adjustable wall includes said main movable panel.

2. The stowage device according to claim 1 wherein:
the side walls extend along the longitudinal direction between back edges and the front edges,
the front edges of the side walls define the opening, and
the rotation axis is substantially parallel to the front edge of the adjustable wall, and
the rotation axis is distant between 3 centimetres and 10 centimetres from the opening.

3. The stowage device according to claim 1 wherein the rotation axis is substantially perpendicular to the longitudinal axis.

4. The stowage device according to claim 1 wherein:
the frame comprises a fixed panel, and
the adjustable wall comprises the main movable panel and the fixed panel.

5. The stowage device according to claim 1, wherein:
the frame comprises a fixed panel,
the adjustable wall comprises the main movable panel and the fixed panel,
in the retracted position, the main movable panel is parallel to the fixed panel and flush with the fixed panel, and
in the protruding position, the main movable panel is angled with respect to the fixed panel.

6. The stowage device according to claim 5 wherein in the protruding position the main movable panel is angled between 5 degrees and 20 degrees with respect to the fixed panel.

7. The stowage device according to claim 1, wherein:
the housing further has a fixing flange extending outside the internal space and proximate the opening.

8. The stowage device according to claim 1, wherein the movable element is urged in the retracted position.

9. The stowage device according to claim 1 further comprises a spring urging the movable element.

10. The stowage device according to claim 1, comprising a retaining element, which limits the movement of the movable element to the protruding position.

11. The stowage device according to claim 10 wherein the retaining element is flexible and comprises a first end fixed to the movable element and a second end fixed to the frame.

12. The storage device according to claim 10, wherein the retaining element comprises an abutting element against which the movable element abuts in the protruding position.

13. The stowage device according to claim 10 wherein the retaining element is adjustable to modify the protruding position.

14. The stowage device according to claim 1, comprising a closing part, which closes a gap between the main movable panel and the frame in order to avoid any jamming of the respiratory mask in the protruding position of the movable element.

15. The stowage device according to claim 14, wherein the closing part is a flexible element and the flexible element extends between an edge of the movable element and an edge of the frame.

16. The stowage device according to claim 14, wherein the closing part is rigid and is integral with the movable element, the movable element comprising:
a back movable panel extending substantially perpendicularly to the main movable panel,
a first lateral movable panel and a second lateral movable panel extending substantially perpendicularly to the main movable panel and to the back movable panel.

17. The stowage device according to claim 16, wherein the movable element comprises a first slot between the back movable panel and the first lateral movable panel and a second slot between the back movable panel and the second lateral movable panel, a first lateral frame panel of the frame slides in said first slot and a second lateral frame panel of the frame slides in said second slot when the movable element moves between the retracted position and the protruding position.

18. Emergency equipment for aircraft crewmember comprising:
the stowage device according to claim 1,
a respiratory mask comprising an oronasal face piece and an inflatable harness connected to the oronasal face piece, the oronasal face piece being adapted to be applied in a use position on a face of a user and the inflatable harness being connected to the oronasal face piece and adapted to maintain the respiratory mask on the face of a user, in a stowage position of the emergency equipment the respiratory mask is in the internal space and the movable element is in the protruding position, and
an oxygen supply tube connected to the respiratory mask for supplying the respiratory mask with oxygen.

19. The emergency equipment according to claim 18, wherein:
the opening is covered by two doors mounted on the frame,
a hole is provided between said doors, and
a portion of the respiratory mask goes through said hole in the stowage position.

20. The emergency equipment according to claim 18, wherein the oxygen supply tube is connected to a fluid connector supported by the back wall, for connecting the oxygen supply tube to an oxygen supply device.

21. Installation comprising the emergency equipment according to claim 18 and an instrument panel having a compartment in which the housing is placed, said instrument panel being provided inside a cockpit of an aircraft.

22. A stowage device of emergency equipment for aircraft crewmember, the stowage device comprising a housing, the housing extends along a longitudinal direction and has side walls, a back wall and an opening opposite to the back wall, the side walls and the back wall define an internal space adapted to stow a respiratory mask in a stowage position, the side walls extend along said longitudinal direction up to front edges delimiting the opening, and the back wall comprises a fluid connector,
wherein:
one of the side walls is an adjustable wall,
the housing comprises a frame and a movable element,
the movable element is mounted on the frame and is movable between (a) a retracted position in which the internal space defines a first volume and (b) a protruding position in which the internal space defines a second volume greater than the first volume, the movable element being rotatably mounted on the frame about a rotation axis that is distant from the opening along the longitudinal direction,
the movable element comprises a main movable panel, and
the adjustable wall includes said main movable panel.

23. A stowage device for a respiratory mask of an aircraft crewmember, the stowage device comprising a housing comprising:
a. a back wall comprising a fluid connector;
b. an opening (i) opposite the back wall and (ii) through which a portion of the respiratory mask is configured to protrude when the respiratory mask is stowed in the housing;
c. a frame; and
d. a movable element mounted on the frame and comprising a main movable panel (i) having a free end and (ii) movable between (A) a retracted position in which the free end is adjacent the back wall and (B) a protruding position in which the free end is distant from the back wall.

* * * * *